United States Patent [19]

Nishiwaki et al.

[11] Patent Number: 5,436,422

[45] Date of Patent: Jul. 25, 1995

[54] RESISTANCE WELDING CONTROL METHOD

[75] Inventors: Toshihiro Nishiwaki; Tatsuo Morita, both of Tokyo, Japan

[73] Assignee: Obara Corporation, Tokyo, Japan

[21] Appl. No.: 257,807

[22] Filed: Jun. 10, 1994

[30] Foreign Application Priority Data

Jul. 16, 1993 [JP] Japan .................................. 5-197661

[51] Int. Cl.6 .............................................. B23K 11/25
[52] U.S. Cl. .................................................... 219/110
[58] Field of Search ........................ 219/108, 110, 109

[56] References Cited

U.S. PATENT DOCUMENTS 5,083,003 1/1992 Clark, Jr. et al. ................... 219/110
5,276,308 1/1994 Hasegawa ............................ 219/110

*Primary Examiner*—Clifford C. Shaw
*Attorney, Agent, or Firm*—Flynn, Thiel, Boutell & Tanis

[57] ABSTRACT

A resistance welding control method capable of reducing generation of spatter to the utmost during consumption of electrodes, thereby obtaining a desired nugget and assuring excellent welding quality and controlling with ease. The resistance welding control method comprises the steps of detecting a primary or secondary voltage when the welding current is supplied to the workpiece, monitoring a resistance value of the workpiece at welding operation with the lapse of time based on the primary or secondary voltage and the welding current which is detected in synchronization with the detection of the primary or secondary voltage so that an expansion tendency of electrode tip diameter is recognized and stored as first data in a computer of the resistance welding apparatus and at the same time a spatter generation condition at welding operation is learned and stored as second data in the computer, obtaining a welding current pattern based on the first and second stored data and statistically processed data stored in the computer, and controlling resistance welding by the welding current pattern so as to obtain a desired nugget while reducing generation of spatter to the utmost even in the consumption of electrodes.

7 Claims, 3 Drawing Sheets

RESISTANCE WELDING CONTROL METHOD

BACKGROUND OF THE INVENTION

1. Field of the Invention

The present invention relates to a resistance welding control method for supplying welding current to a workpiece to thereby perform welding.

2. Prior Art

In most cases, generation of particles of molten metal expelled or spattered during welding operation (hereinafter referred to as generation of spatter) becomes a criterion of judgment of satisfactory welding in a welding site, namely, the formation of a desired nugget. There is employed a method, as means for coping with the generation of spatter, that welding current is stopped from flowing or welding current is reduced after the detection of the generation of spatter.

When the resistance welding apparatus repeats welding operation, the electrode tip diameter is gradually expanded, thereby lowering the current densities at the welded portion, and hence some welding apparatus increases welding current, etc. as one of the welding conditions every moment with the lapse of time.

However, since the resistance welding is controlled in the prior art means, which is provided for coping with the generation of spatter after the generation of spatter is detected, there is a problem that this prior art means is not effective for preventing the generation of spatter so that a high welding quality can not be obtained and the welding site environment is deteriorated. In a system which has been widely used for several years for setting an increasing ratio of welding current arbitrarily by an operator, there is a problem that it is difficult to reduce the generation of spatter and meet the desired welding quality even by resorting to much experience and skills of the operator.

SUMMARY OF THE INVENTION

The present invention has been made in view of the problems of the prior art resistance welding control method, and has an object to provide a resistance welding control method capable of reducing generation of spatter to the utmost during consumption of electrodes, thereby obtaining a desired nugget and assuring excellent welding quality and controlling with ease.

To achieve the above object, the resistance welding control method of the first aspect of the present invention is characterized in the steps of detecting a primary voltage, i.e. voltage across a primary winding of a transformer or a secondary voltage, i.e. voltage across a secondary winding of the transformer when the welding current is supplied to the workpiece, monitoring a resistance value of the workpiece at the welding operation with the lapse of time based on the voltage of the transformer and the welding current which is detected in synchronization with the detection of the voltage of the transformer so that an expansion tendency of an electrode tip diameter is recognized and stored as first data in a computer of the resistance welding apparatus and at the same time a spatter generation condition at the welding operation is learned and stored as second data in the computer, obtaining a welding current pattern based on the first and second stored data and statistically processed data stored in the computer, and controlling resistance welding by the welding current pattern so as to obtain a desired nugget while reducing generation of spatter to the utmost even in the consumption of electrodes.

A second aspect of the resistance welding control method of the present invention is characterized in the steps of detecting a primary or secondary voltage of a transformer when welding current is supplied to a workpiece and controlling welding resistance based on a welding current pattern which is adapted for the resistance value of the workpiece during several tens of msec in real time in response to the resistance value of the workpiece at the welding operation based on the voltage of transformer and welding current which is detected in synchronization with the detection of the voltage of the transformer.

A third aspect of the resistance welding control method of the present invention is characterized in the steps of detecting a primary or secondary voltage of a transformer when welding current is supplied to a workpiece, monitoring a resistance value of the workpiece at the welding operation every moment with the lapse of time based on the voltage of transformer and welding current which is detected in synchronization with the detection of the voltage of the transformer, timely decreasing the welding current depending on the spatter generation condition and thereafter increasing the welding current again upon elapse of a given time.

With the arrangement of the invention, when the given welding current is supplied to the workpiece, the resistance value of the workpiece is monitored with the lapse of time so that the expansion tendency of electrode tip diameter is recognized and stored as data in the computer and at the same time spatter generation condition at the welding operation is learned and stored as another data in the computer. A welding current pattern is obtained based on these stored data and statistically processed data for controlling the resistance welding so as to obtain a desired nugget while reducing the generation of spatter to the utmost even in the consumption of electrodes.

PREFERRED EMBODIMENT OF THE INVENTION

Figure 1:
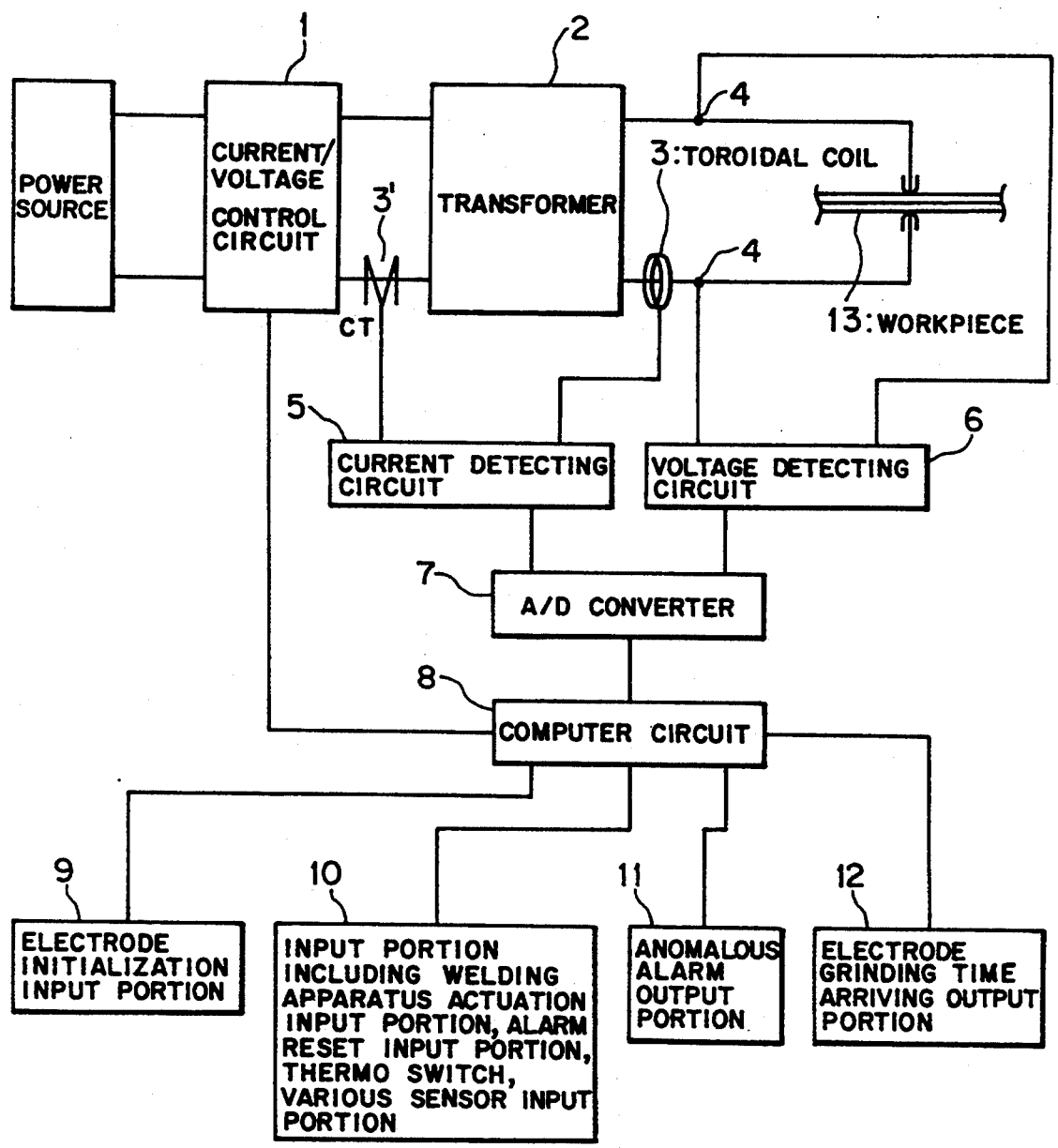
FIG. 1 is a circuit diagrams of a resistance welding apparatus adapted for performing a resistance welding control method according to a preferred embodiment of the present invention.

FIG. 1 is a circuit diagram of a resistance welding apparatus (hereinafter referred to as an apparatus) adapted for performing a resistance welding control method. Three-phase power is supplied to a current/voltage control circuit I in case of direct current welding using an inverter and single-phase power is supplied to the current/voltage control circuit 1 in case of a general resistance welding using a thyrister for phase control. Voltage which is controlled by the current/voltage control circuit 1 is supplied to a transformer 2 which supplies welding current to a workpiece 13 for performing resistance welding.

Current detected by a toroidal coil 3 or a current transformer CT 3' is supplied to a computer circuit 8 through a current detecting circuit 5 and an A/D converter 7 as a welding current feedback signal. A secondary voltage (it may be primary voltage) which is detected by a secondary voltage detector 4 at a welding operation when the welding current is supplied to the workpiece 13 is supplied from a voltage detecting circuit 6 to the computer circuit 8 through the A/D converter 7 as a resistance calculation data and a spatter generation detecting signal so as to inform an expansion tendency of an electrode tip diameter to the computer circuit 8.

There are further provided an electrode initialization input portion 9 for permitting the computer circuit 8 to recognize the completion of replacement of electrodes with new ones or grinding of the electrode tip, an input portion 10 composed of an actuation input portion for actuating the apparatus, an alarm reset input portion in case of an generation of alarm, a thermo switch, a various sensor input portion, an anomalous alarm output portion 11 for issuing anomaly of the apparatus or anomalous alarm obtained from various sensor data and an electrode grinding time arriving output portion 12 for informing of a necessity of initialization of the electrodes to the computer circuit 8. The current/voltage control circuit 1 is connected to and controlled by the computer circuit 8.

At the start of using of the apparatus when the apparatus as illustrated in FIG. 1 is installed in a welding site, the apparatus has neither the data of electrode variation involving the lapse of time nor the data of a spatter generation point involved in the electrode variation. Therefore, the electrodes must be initialized before using the apparatus and the completion of initialization is input to the electrode initialization input portion 9 for informing the completion of the initialization to the computer circuit 8. The welding current flows during the from first time initialization time to grinding time for one to several impacting times based on a welding current pattern for forming a desired nugget which is estimated by material and thickness, etc. of the workpiece 13. A resistance or resistance value of the workpiece 13 and a spatter generation condition (a so-called spatter generation point representing which cycle that spatter is generated, in the case of detection of generation or nongeneration of spatter, hereinafter referred to as "spatter generation condition") are stored in the computer circuit 8 based on the welding current which is detected by the toroidal coil 3 or the current transformer CT 3' and on the secondary voltage which is detected by the secondary voltage detector 4.

Figure 2:
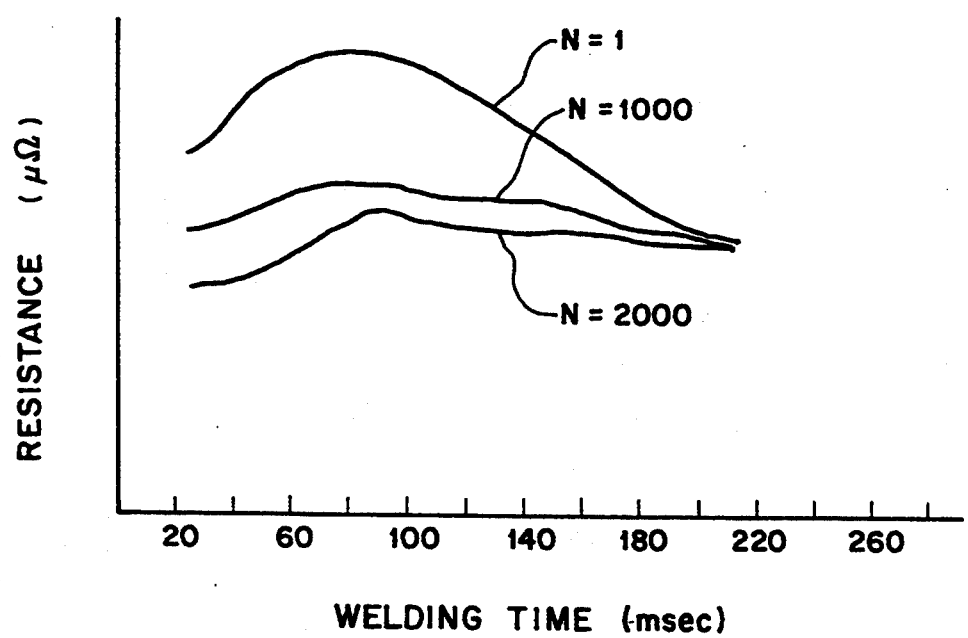
FIG. 2 is a view showing relationship between the cycle of flow of welding current and resistance value in each impacting time.

A galvanized steel plate, with which it is difficult to obtain expansion tendency of the electrode tip diameter, is tested and the relationship between welding time and resistance value in every impacting point or time (e.g. n=1, N=1000, N=2000) is shown in FIG. 2. According to this test, although electrode consumption tendency (expansion tendency of electrode tip diameter) is changed depending on the various conditions at the start of flow of the welding current, it appears sharp during 10 to 60 msec (hereinafter this is defined as "resistance value for obtaining apparent expansion tendency of the electrode tip diameter"). Since the resistance value is actually varied for every welding impacting time depending on various conditions, it is preferable to employ data which is averaged by filling up this data by the past calculated data.

In FIG. 1, the computer 8 has no data for the spatter generation point, etc., which is generated at the electrode variation involving in the lapse of time at the start of using of the apparatus. Accordingly, a welding current pattern, which is a limit value immediately before the generation of spatter, is based on the spatter generation point and resistance value at that time are obtained and stored in the computer circuit 8.

The welding current first flows based on the aforementioned welding current pattern. At this time, the resistance value and the spatter generation condition are stored in the computer circuit 8 every time the welding current flows. This is repeated likewise. As a result of the flow of the welding current, the generation or nongeneration of spatter is checked. If spatter is generated, spatter generation conditions of all the groups, which are previously stored in the computer circuit 8, and the spatter generation condition of the present group, which is actually generated and stored in the computer, are respectively subjected to previously specified weighting in the previously specified impacting interval going back to the past, thereby judging whether the spatter is generated incidentally or not.

In case of nongeneration of spatter (incidental) as a result of the judgment, the welding current continues to flow under the same condition. On the other hand, in case of generation of spatter, the resistance value as measured in the previous manner is compared with that of the same group as measured when the spatter is not generated, thereby checking that the electrode tip diameter is varied or not. If the electrode tip diameter has no reducing tendency, the welding current flows under the same condition as made before. Whereupon, if the electrode tip diameter has a reducing tendency, the welding current flows while reducing the welding current pattern since there is a likelihood of the variation of the electrode tip contour or of reduction of the apparent electrode tip diameter depending on the impacting time and pressure application condition although the electrode tip diameter has a tendency to be normally expanded at every impacting time.

In case of nongeneration of spatter as a result of the flow of welding current based on the aforementioned welding current pattern, the expansion tendency of the electrode tip diameter of all the groups which are previously stored in the computer circuit 8 and the expansion tendency of that of the present group are respectively subjected to the previously specified weighting in the previously specified impacting interval going back to the past, thereby judging whether the electrode tip diameter has the expansion tendency or not. If the expansion tendency of electrode tip diameter is recognized, the welding current pattern is increased in a given ratio. If the expansion tendency of electrode tip diameter is not recognized, the welding current flows under the same condition.

The welding resistance for the same electrodes at the first welding operation is controlled while the welding current flows repeatedly based on the welding current pattern. When the first welding operation is completed to thereby initialize the electrodes and successively the welding resistance at a second welding operation is controlled, the welding current flows based on the welding current pattern which is the limit value immediately before the generation of spatter and is calculated or obtained at the first initialization of the electrodes.

The welding current flows based on the aforementioned obtained welding current. At this time, the resistance value and the spatter generation condition are stored in the computer circuit 8 every time the welding current flows. This is repeated likewise. As a result of the flow of the welding current, the generation or nongeneration of spatter is checked. If the spatter is generated, the spatter generation conditions of all the groups which are previously stored in the computer circuit 8 and the spatter generation condition of the present group which is actually generated and stored in the computer are respectively subjected to previously specified weighting in the previously specified impacting interval going back to the past, thereby judging whether the spatter is generated incidentally or not.

In case of nongeneration of spatter (incidental) as a result of the judgment, the welding current continues to flow under the same condition. On the other hand, in case of generation of spatter, the resistance value as measured in the previous manner is compared with that of the same group as measured when the spatter is not generated, thereby checking that the electrode tip diameter is varied or not. If the electrode tip diameter has no reducing tendency, the welding current flows under the same condition as made before. Whereupon, if the electrode tip diameter has a reducing tendency, in principle the welding current flows while reducing the welding current pattern since there is a likelihood of the variation of the electrode tip contour or of a reduction of the apparent electrode tip diameter depending on the impacting time and pressure application condition although the electrode tip diameter has a tendency to be normally expanded at every impacting time. However, the present welding current pattern is compared with that at the impacting time which is stored in the first welding operation, thereby checking as to whether a welding current pattern is too low in its level and adequacy thereof so that there is a likelihood that any massage representing thereof is output and the welding current is not reduced.

As a result of the flow of welding current based on the aforementioned obtained welding current value, if there is no generation of spatter, a next welding current pattern succeeding to that at the impacting time is obtained with reference to the welding current pattern which is stored in the first welding operation. Successively, the expansion tendency of the electrode tip diameter of all the groups which are previously stored in the computer circuit 8 and the expansion tendency of the present group are respectively subjected to the previously specified weighting in the previously specified impacting interval going back to the past, thereby judging whether the electrode tip diameter has the expansion tendency or not. If the expansion tendency of electrode tip diameter is recognized, the welding current flows while the welding current pattern is increased depending on the expansion tendency of electrode tip diameter with reference to the welding current pattern which is stored in the first welding operation. If the expansion tendency of the electrode tip diameter is not recognized, the welding current flows under the same condition.

The welding resistance for the same electrodes at the second welding operation is controlled while the welding current flows repeatedly based on the previously obtained welding current pattern. When the second welding operation is completed to thereby initialize the electrodes and successively the welding resistance at a third welding operation is controlled, the welding current flows with reference to the welding current pattern which is the limit value immediately before the generation of spatter which is obtained at the initialization of the electrodes and that has been stored in the computer circuit so far.

In most cases using the means and methods as mentioned above, the generation of spatter is remarkably reduced compared with the conventional cases and the formation of nugget (welding quality) is enhanced but the reliability of the welding quality is increased more if the following means and methods are added to the aforementioned means and methods. That is, the electrode tip diameter at the portion where the electrode tip contacts the workpiece (the apparent expansion tendency of electrode tip diameter is considered as various factors influencing this electrode tip diameter) influences greatly to the formation of the nugget to be formed thereafter. Accordingly, if mating with the workpiece, plating condition, pressure application condition, etc. are considerably varied, the welding resistance may be controlled on the basis of the welding current pattern previously adapted for the resistance value during the time of several tens of msec in real time in response to the resistance value every time the welding current flows. In this case, "welding current previously adapted for the resistance value" means the welding current which is obtained by test data depending on the workpiece (material, thickness and number of workpieces to be joined) but which is neither obtained by nor based on a so-called thermal analogous law nor based on a constant power control.

In the welding current pattern based on the thermal analogous law, the nugget at the joined portion of the workpieces is so quickly formed that the generation of spatter is likely to occur. When the generation of the spatter occurs by the constant power control, the resistance value is extremely lowered, thereby lowering the current and thereafter the generation of strong spatter is likely to occur.

Figure 3:
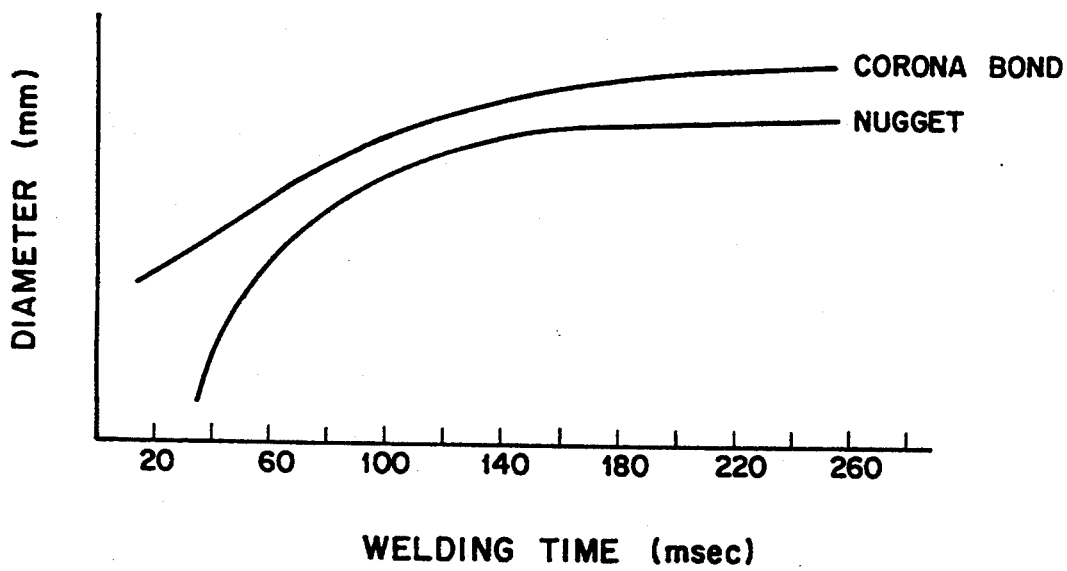
FIG. 3 is an exemplified view showing formation of a corona bond diameter and a nugget diameter by way of relationship between the cycle of flow of welding current and electrode tip diameter.
Figure 4:
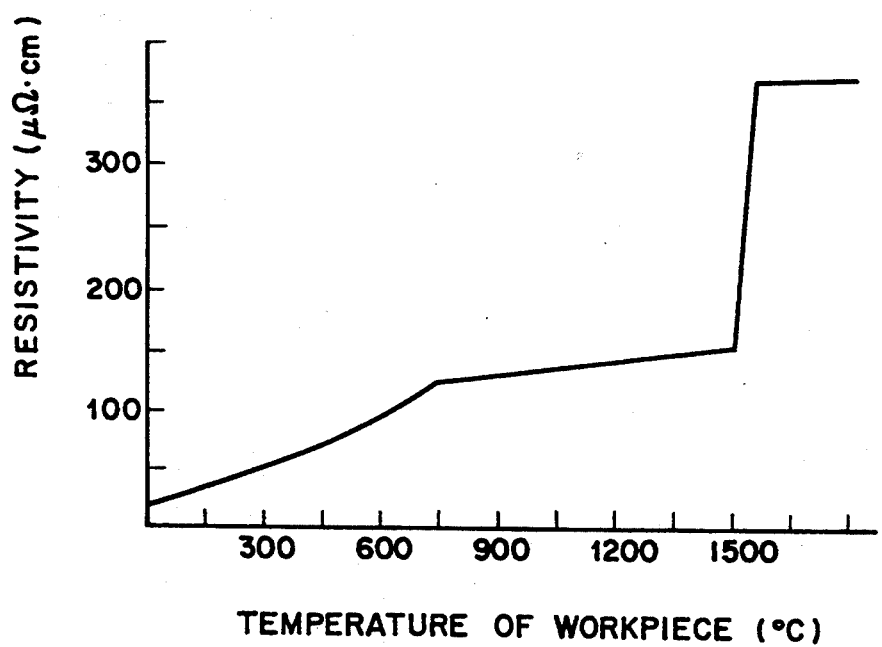
FIG. 4 is a view showing relationship between temperature of a workpiece and resistivity of the same when the workpiece is melted.

The generation of spatter will be described more in detail with reference to FIGS. 3 and 4.

During the formation of the nugget, the generation of the spatter is likely to occur at the position where the corona bond diameter is close to the nugget diameter. The generation of spatter can be estimated to some extent by monitoring the resistance variation (resistance value) every moment. This is evident from the fact that the nugget occupies much of the electrode tip diameter at the portion where the electrode tip contacts the workpiece and at the portion where the corona bond diameter is close to the nugget diameter and resistivity is extremely increased when the workpieces are melted as shown in FIG. 4. Accordingly, since the portion where the generation of spatter is likely to occur or the instant where spatter was generated can be respectively caught or obtained, it is possible to extremely reduce the generation of spatter to the utmost and to maintain the electrode quality in a good condition even in the consumption of electrodes by utilizing the aforementioned means and methods adapted for the present invention.

In case of reducing the welding current so as to keep the generation of spatter to the minimum, namely, to restrain the spatter from expanding when spatter is detected while the welding current flows, the welding current can be increased again so as to form a much larger diameter of nugget even if the difference of the diameter of the nugget and that of the corona bond immediately before the completion of the flow of the welding current is increased so that the spatter is not likely to generate.

It is a matter of course that the present invention can be applied to the resistance welding control method which controls the time of the flow of the welding current, pressure application force, etc. as well as the control of the welding current control. Furthermore, the aforementioned embodiment is one of the embodiments, and hence the present invention can be variously modified.

Accordingly, the present invention can be effectively applied to the resistance welding control method having unstable factors compared with a prior art mechanical judgment and process which can be obtained from a single factor since welding phenomenon having unstable factors in the welding operation can be judged and processed based totally on various data such as the control of the electrodes by obtaining spatter generation condition and expansion tendency of the electrode tip diameter every moment, judgment based on statistically processed data learned and stored in the computer, and the control of the welding current (welding energy) corresponding to the resistance value (resistance variation) to be performed at real time.

What is claimed is:

1. A resistance welding control method in a resistance welding apparatus having welding electrodes for welding a workpiece by supplying a welding current to said workpiece, said method comprising the steps of:
   detecting a voltage in the resistance welding apparatus when said welding current is supplied to said workpiece;
   detecting said welding current;
   monitoring a resistance value of said workpiece during a welding operation over a lapse of time, said resistance value based on said voltage and said welding current which is detected in synchronization with the detection of said voltage;
   determining an expansion tendency of an electrode tip diameter which is stored as first data in a computer of said resistance welding apparatus and at the same time determining a spatter generation condition for said welding operation which is stored as second data in said computer;
   obtaining a welding current pattern based on said first and second data stored in said computer as well as, when a spatter of material of said workpiece is generated during said welding operation, based on a judging as to whether said spatter being generated is incidental to said welding operation or inevitable based on said first and second data stored in said computer; and
   controlling said resistance welding operation by control of said welding current relative to said welding current pattern before reaching said spatter generation condition so as to obtain a desired nugget while reducing generation of said spatter.

2. A resistance welding control method according to claim 1, wherein said controlling of said resistance welding is based on said welding current pattern previously obtained for said resistance value of said workpiece during several preceding tens of msec in response to said resistance value every time the welding current flows.

3. A resistance welding control method according to claim 2, wherein said monitoring of said resistance value of said workpiece which varies is continuous over the lapse of time, said method further comprising the steps of decreasing said welding current depending on said spatter generation condition, and thereafter increasing said welding current again upon an elapse of a given time.

4. A resistance welding control method according to claim 1, wherein said monitoring of said resistance value of said workpiece which varies is continuous over the lapse of time, said method further comprising the steps of decreasing said welding current depending on said spatter generation condition, and thereafter increasing said welding current again upon an elapse of a given time.

5. A resistance welding control method in a resistance welding apparatus having welding electrodes for welding a workpiece by supplying a welding current to said workpiece, said method comprising the steps of:
   detecting a voltage in the resistance welding apparatus when said welding current is supplied to said workpiece;
   detecting said welding current in synchronization with the detection of said voltage;
   monitoring a resistance value of said workpiece during a welding operation over a lapse of time, said resistance value based on said voltage and said welding current;
   determining a variation tendency of an electrode tip diameter in response to said monitoring of said resistance value which is stored as first data in a computer of said resistance welding apparatus and at the same time determining a spatter generation condition for said welding operation which is stored as second data in said computer;
   obtaining a welding current pattern based on said first and second data stored in said computer, said welding current pattern defining a limit for said welding current to reduce generation of a spatter of material of said workpiece during a welding operation;
   checking for the generation of said spatter during the welding operation;
   when a spatter of material of said workpiece is generated, judging as to whether said spatter being generated is incidental to said welding operation or inevitable based on at least said second data stored in said computer;
   determining an adjustment for said welding current pattern and thereby said welding current based on at least said first data, whether spatter is being generated and said judgment of whether said spatter is inevitable or incidental; and
   controlling said resistance welding operation by control of said welding current below said welding current pattern so as to obtain a desired nugget while reducing generation of said spatter.

6. A method as defined in claim 5, wherein said step of determining an adjustment of said welding current pattern includes the step of reducing said welding current pattern upon judging that said spatter being generated is inevitable and determining that said electrode tip diameter has a reducing tendency.

7. A method as defined in claim 5, wherein said step of determining an adjustment of said welding current pattern includes the step of increasing said welding current pattern when determining that said electrode tip diameter has an expansion tendency and there is no generation of spatter.

* * * * *